United States Patent [19]

Fodor

[11] 4,203,428

[45] May 20, 1980

[54] SOLAR HEATER

[76] Inventor: Joseph E. Fodor, 712 Shore Dr., Boynton Beach, Fla. 33435

[21] Appl. No.: 920,465

[22] Filed: Jun. 29, 1978

[51] Int. Cl.$^2$ ............................................. F24J 3/02
[52] U.S. Cl. ................................... 126/449; 126/450; 126/432
[58] Field of Search .............. 126/432, 428, 429, 442, 126/449, 450, 901

[56] References Cited

U.S. PATENT DOCUMENTS

| | | | |
|---|---|---|---|
| 2,553,073 | 5/1951 | Barnett | 126/901 |
| 2,680,437 | 6/1954 | Miller | 126/441 |
| 2,680,565 | 6/1954 | Lof | 126/450 |
| 4,092,978 | 6/1978 | Levine | 126/449 |
| 4,117,828 | 10/1978 | Brownfield | 126/425 |

*Primary Examiner*—James C. Yeung
*Attorney, Agent, or Firm*—Oltman and Flynn

[57] ABSTRACT

This solar heater has a plenum enclosure in the middle of a housing which contains partially overlapping, inclined, blackened aluminum sheets on opposite sides of the plenum enclosure. The interior of the plenum enclosure is divided into an inlet plenum and an outlet plenum, which communicate respectively with the opposite ends of air passages between the sheets. For optimum conversion of solar radiation into heating of the air, each sheet is not more than 0.010 inch thick and the spacing between neighboring sheets where they overlap is not more than 0.025 inch. Air is circulated at a high enough rate to absorb heat from the plates substantially as fast as it is produced in the plates by solar radiation.

7 Claims, 5 Drawing Figures

4,203,428

SOLAR HEATER

BRIEF SUMMARY OF THE INVENTION

Various solar heaters have been proposed heretofore in which air is passed between partially overlapping, inclined plates which become heated by solar radiation. Examples of such prior solar heaters are disclosed in U.S. Pat. No. 2,553,073 to Barnett and U.S. Pat. No. 2,680,437 to Miller.

The present invention is directed to a novel solar heater of this general type which has improved performance because the partially overlapping plates are of extremely thin, conductive metal and are so closely spaced as to provide more efficient heat transfer to the air flowing between them. In accordance with this invention, the plates have a thickness of not more than 0.010 inch (0.025 cm.) each and they are spaced apart by not more than 0.025 inch (0.063 cm.) where they overlap. Air is circulated through the solar heater at a sufficiently high volumetric rate that the heat generated in the plates by their absorption of solar radiation will be transferred to the air substantially at the same rate as it develops in the plates.

In accordance with the presently-preferred embodiment, the present solar heater has a plenum enclosure with overlapping solar radiation absorbing plates extending on opposite sides of it. This enclosure is divided by an interior baffle into an inlet plenum and an outlet plenum. Elongated openings in the opposite sides of the plenum enclosure connect the inlet plenum to one end of the spaces between the plates on both sides. Additional elongated openings in the opposite sides of the plenum enclosure pass heated air from the opposite end of the spaces between the plates on both sides back into the outlet plenum. The outlet plenum is connected to a heat sink or heat transfer device, which preferably uses the heated air to heat water in a tank.

The principal object of this invention is to provide a novel and improved solar heater which uses solar radiation to heat air.

Another object of this invention is to provide a novel solar heater having solar radiation-absorbing plates of thin, high conductivity metal which partially overlap one another in closely spaced relationship for improved heat transfer to air which is circulated between them.

Further objects and advantages of this invention will be apparent from the following detailed description of a presently-preferred embodiment thereof, which is shown in the accompanying drawings.

DETAILED DESCRIPTION

Figure 1:
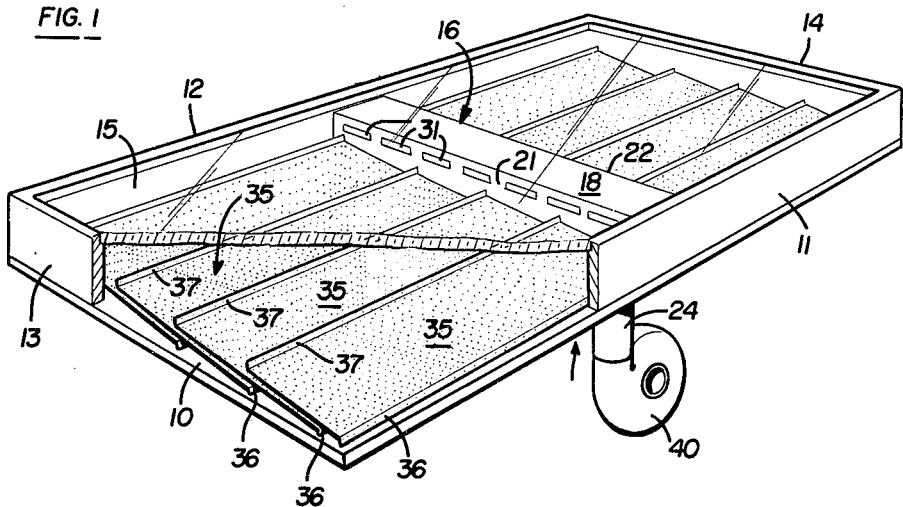
FIG. 1 is a perspective view of a solar heater in accordance with the present invention with part of its housing broken away for clarity.
Figure 2:
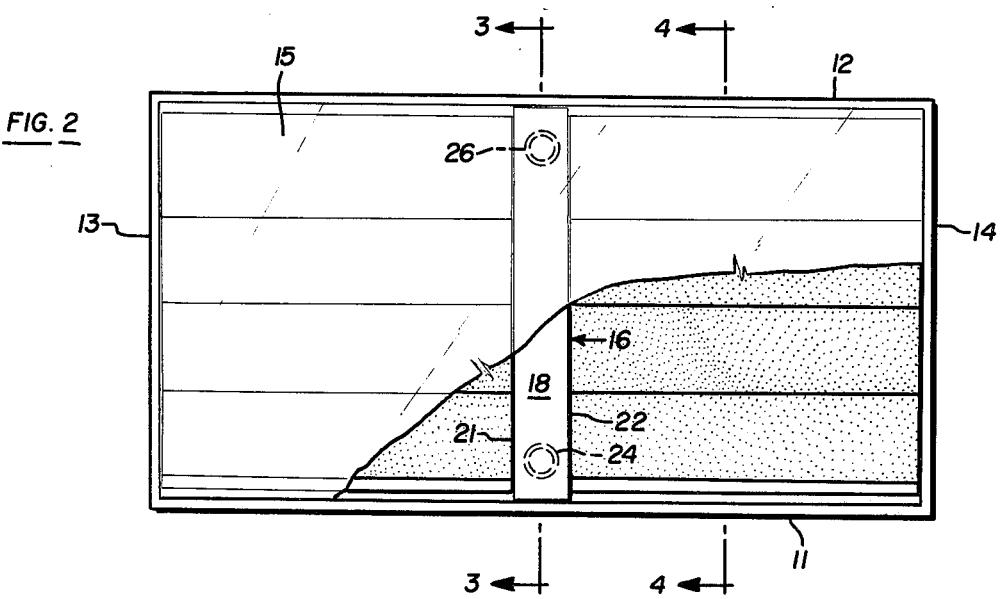
FIG. 2 is a top plan view of this heater with the top cover of its housing broken away for clarity.

Referring first to FIGS. 1 and 2, the present solar heater has a box-like, rectangular housing with a flat bottom wall 10, upstanding front and back walls 11 and 12, and upstanding opposite end walls 13 and 14. A top cover 15 of glass or acrylic plastic which is transparent to solar radiation extends between the front back and end walls and is spaced above the bottom wall 10.

Figure 3:
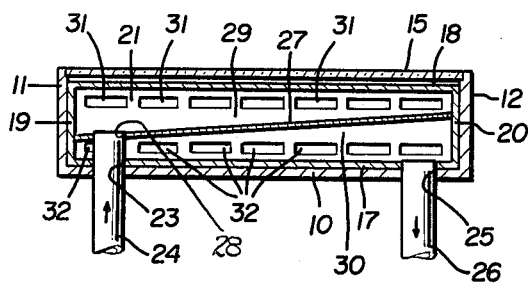
FIG. 3 is a vertical cross-section taken along the line 3—3 in FIG. 1 through the centrally located plenum of the solar heater.

Inside the housing at a location midway between its opposite end walls 13 and 14, a box-like rectangular plenum enclosure 16 extends between the front and back walls 11 and 12 of the housing. As shown in FIG. 3, this plenum enclosure has a flat bottom wall 17 which rests directly on the bottom wall 10 of the housing, a flat top wall 18 spaced slightly below the top cover 15 of the housing, an upstanding front wall 19 extending directly behind the front wall 11 of the housing, an upstanding back wall 20 extending directly in front of the back wall 12 of the housing, and upstanding opposite side walls 21 and 22. The top and end walls 19, 19 and 20 of the plenum enclosure are imperforate.

Close to the front wall 19 the bottom wall 16 of the plenum enclosure has an opening 23 through which an air inlet pipe 24 extends in air-tight fashion. Close to its back wall 20 the bottom wall of the plenum enclosure has an opening 25 through which an air outlet pipe 26 extends in air-tight fashion. A flat plate 27 extends between the side walls 21 and 22 and the front and back walls 19 and 20 of the plenum enclosure at a slight angle upward from front to back. The upper end of the air inlet pipe 24 extends up through an opening 28 in this plate in air-tight fashion. The plate 27 serves as an internal baffle which divides the interior of the plenum enclosure into an air inlet plenum 29 above the plate and an air outlet plenum 30 below. The air inlet plenum 29 receives air from the air inlet pipe 24. The air outlet plenum 30 communicates with the upper end of the air outlet pipe 26.

As shown in FIG. 3, the side wall 21 of the rectangular plenum enclosure 16 is formed with a first plurality of openings 31, which are located above the baffle plate 27 and are spaced apart in succession from the front wall 19 to the back wall 20 of this enclosure. Preferably, as shown, each of these openings is horizontally elongated in the front to back direction. This same side wall of the plenum enclosure has a second plurality of similar openings 32 in succession from front to back below the baffle plate 27.

Figure 4:
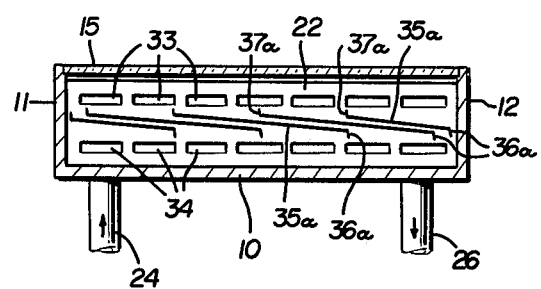
FIG. 4 is a vertical cross-section taken along the line 4—4 in FIG. 1 on one side of the plenum.

As shown in FIG. 4, the opposite side wall 22 of the plenum enclosure is formed with a third plurality of similar openings 33, all of which are located above the baffle plate 27. Also, this side wall 22 has a fourth plurality of such openings 34, all of which are located below the baffle plate 27 in the plenum enclosure.

Between the left end wall 13 of the housing and the left side wall 21 of the plenum enclosure 16 in FIG. 1, a plurality of solar radiation-absorbing sheets 35 are positioned in spaced, inclined, partly overlapping relationship in succession from front to back in the housing. Each sheet presents a depending vertical lip 36 at its lower front end and an upwardly extending vertical lip 37 at its upper back end. At the left end in FIG. 1 each of these sheets is attached in air-tight fashion to the housing end wall 13, and at the right end each sheet is similarly attached in air-tight fashion to the side wall 21 of the plenum enclosure 16 above the lower openings 32 and below the upper openings 31 in this side wall. As shown in FIG. 1, the upper edges of the top end lips 37 on these sheets are below the bottom edges of the upper openings 31 in the plenum enclosure side wall 21. Similarly, the lower edges of the bottom end lips 36 on these sheets are above the top edges of the lower openings 32 in this side wall of the plenum enclosure. With this arrangement the inclined spaces between the successive overlapping sheets 35 communicate at their upper ends with the openings 31 and communicate at their lower ends with the openings 32.

The sheets 35 are of aluminum which preferably is blackened to improve its ability to absorb solar radiation and convert it into heat energy. Preferably, to enhance its structural rigidity and avoid sagging at the middle, each sheet is formed with shallow, v-shaped, alternate peaks and valleys which extend between its end lips 36 and 37 are spaced apart in succession from the plenum enclosure 16 out to the housing end wall 13.

In accordance with the present invention, each solar radiation-absorbing sheet 35 has a thickness of not more than substantially 0.010 inch (0.025 cm.) and the air passages between successive overlapping sheets where they overlap is not more than substantially 0.025 inch (0.063 cm.) for most efficient conversion of solar radiation energy into heating of the air flowing between the sheets.

An identical arrangement of partially overlapping sheets 35a is provided on the opposite side of the plenum enclosure 16. Corresponding elements of these sheets are given the same reference numerals, but with an "a" suffix added. The thickness of these sheets 35a and the size of the air passages between them where they overlap is the same as with the sheets 35.

A blower 40 is connected to the air inlet pipe 24 to circulate air through the solar heater at a rate high enough to take away from the solar radiation-absorbing sheets 35 and 35a substantially all of the heat produced in them by their absorption of solar radiation. This withdrawal of heat energy by air convection, due to the rapid flow of air across the opposite major faces of each sheet, takes place at a rate substantially as fast as the plates themselves convert the solar radiation into heat energy.

It will be apparent that the inlet air delivered by the blower 24 enters the air inlet plenum 29 above the baffle plate 27 in the plenum enclosure 16, and then flows out through the first plurality of openings 31 in one side wall 21 of the plenum enclosure into the housing space where the radiation-absorbing plates 35 are located, and flows out through the third plurality of openings 33 in the opposite side wall 22 of the plenum enclosure into the housing space where the radiation-absorbing plates 35a are positioned. This inlet air flows downward and forward through the inclined air passages between successive overlapping plates 35 and 35a, and then it flows through the second plurality of openings 32 in the plenum enclosure side wall 21 and through the fourth plurality of openings in the opposite side wall 22 of the plenum enclosure, and through the outlet plenum 30 below the baffle plate 27 to the outlet pipe 26.

Because of the thin, all metal construction of the plates 35 and 35a and the small spacing between them a highly effective energy conversion of solar radiation into heated air takes place in this apparatus.

Because of the close spacing between any two overlapping plates, the energy transfer from the upper plate to the lower plate through radiation is highly efficient, so the temperature of the lower plate is nearly the same as the upper plate.

Figure 5:
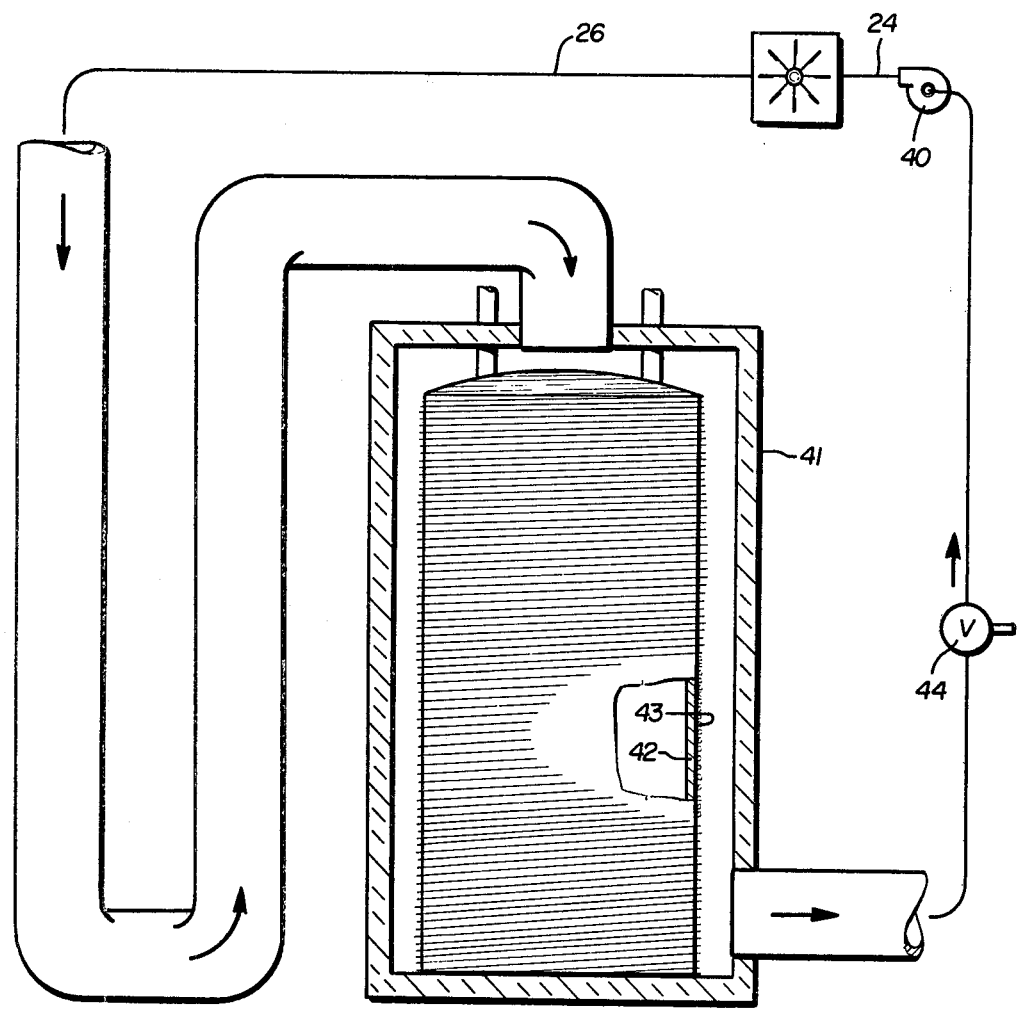
FIG. 5 is a schematic view of a complete solar heating system embodying the present solar heater and a heat-transfer tank, shown in vertical section.

As shown schematically in FIG. 5 the outlet pipe 26 leads to a heat sink or heat transfer apparatus in the form of a hot water tank having a steel outer jacket 41 and a steel inner tank 42 inside the outer jacket 41. Preferably, this hot water tank is in the form of a conventional domestic hot water tank with the usual insulation between its outer jacket and inner tank removed. Wire lath 43 is wrapped around the outside of the inner tank 42, and then the outside of tank 42 and the wire lath are painted black to improve the transfer to the inner tank of heat from the heated air flowing down through the outer jacket 41 around the outside of the inner tank 42. The air leaves the outer jacket 42 at its lower end and goes to a selector valve 44 where it may be either vented to the atmosphere or recirculated back to the inlet of the blower 40. The air drawn in by the blower 40 may be air recirculated from the outer jacket 41 after most of its heat energy has been transferred to the inner tank 42 or it may be ambient air entering the system at valve 44, depending upon how this valve is set.

I claim:

1. In a solar heater having:
    a housing with a top cover which passes solar radiation into the interior of the housing;
    a plurality of inclined solar radiation-absorbing sheets of high heat conductivity material inside said housing which partially overlap each other in succession and are spaced apart to provide air passages between neighboring sheets;
    and means for passing air from outside the housing through said air passages to be heated by said sheets and for withdrawing the heated air from the housing for utilization;
    the improvement wherein:
    said sheets have a thickness of not more than substantially 0.010 inch each where they overlap;
    the spacing between neighboring sheets at said air passages where they overlap is not more than substantially 0.025 inch;
    and said solar heater further comprising:
    a plenum enclosure located centrally in said housing between a plurality of said partially overlapping sheets at one side and a plurality of said partially overlapping sheets at the opposite side;
    means providing an air inlet leading into said plenum enclosure;
    means providing an air outlet spaced from said inlet and leading from the interior of said plenum enclosure;
    and an interior baffle in said plenum enclosure blocking said air inlet from said air outlet;
    said plenum enclosure having openings on one side of said baffle leading into the space between said sheets on both sides of the plenum enclosure for passing air thereto from said air inlet.

2. A solar heater according to claim 1, wherein said sheets are of blackened aluminum.

3. A solar heater according to claim 1, wherein said means for passing air is operative to pass air through said housing at a rate effective to take away from said sheets substantially all of the heat energy substantially as fast as it is produced therein by absorption of solar radiation.

4. In a solar heater having a housing with a top cover which passes solar radiation into the interior of the housing, the combination of:

a plenum enclosure inside said housing having an air inlet, an air outlet spaced from said inlet, and an interior baffle separating said air inlet from said air outlet;

a first plurality of inclined solar radiation-absorbing sheets inside said housing on one side of said plenum enclosure, said sheets partially overlapping one another in succession and being spaced apart to provide air passages between neighboring sheets;

said plenum enclosure having a first plurality of openings in said one side which communicate with said air inlet and lead into one end of said air passages between neighboring sheets;

said plenum enclosure having a second plurality of openings in said one side which lead from the opposite end of said air passages between neighboring sheets and communicate with said air outlet;

a second plurality of inclined solar radiation-absorbing sheets inside said housing on the opposite side of said plenum enclosure, said last-mentioned sheets partially overlapping one another in succession and being spaced apart to provide air passages between neighboring sheets;

said plenum enclosure having a third plurality of openings in said opposite side which communicate with said air inlet and lead into one end of said last-mentioned air passages between neighboring second sheets;

said plenum enclosure having a fourth plurality of openings in said opposite side which lead from the opposite end of said last-mentioned air passages between neighboring second sheets and communicate with said air outlet;

means for circulating air from said air inlet through the plenum enclosure and through the air passages between the sheets on both sides of the plenum enclosure to said air outlet;

and heat transfer means operatively connected to said air outlet to absorb heat from the heated air.

5. A solar heater according to claim 4, wherein said first and second plurality of sheets are aluminum with a thickness of not more than substantially 0.010 inch where they overlap, and the spacing between neighboring sheets at said air passages where they overlap is not more than substantially 0.025 inch.

6. A solar heater according to claim 5, wherein said sheets are blackened.

7. A solar heater according to claim 4, wherein:
said first and third plurality of openings extend in succession along the respective sides of the plenum enclosure on one side of said interior baffle;

and said second and fourth plurality of openings extend in succession along the respective sides of the plenum enclosure on the opposite side of said interior baffle.

* * * * *